United States Patent
Yvin et al.

(10) Patent No.: US 6,915,969 B2
(45) Date of Patent: Jul. 12, 2005

(54) METHOD AND INSTALLATION FOR MAKING FLOUR FROM OZONE-TREATED GRAINS

(75) Inventors: Jean-Claude Yvin, Saint Malo (FR); Alain Bailli, Menucourt (FR); Jean-Marie Joubert, Saint Malo (FR); Olivier Bertaud, Boulogne (FR)

(73) Assignee: Green Technologies Sarl, Saint Malo (FR)

( * ) Notice: Subject to any disclaimer, the term of this patent is extended or adjusted under 35 U.S.C. 154(b) by 155 days.

(21) Appl. No.: 10/168,004

(22) PCT Filed: Dec. 18, 2000

(86) PCT No.: PCT/FR00/03573
§ 371 (c)(1),
(2), (4) Date: Aug. 27, 2002

(87) PCT Pub. No.: WO01/43556
PCT Pub. Date: Jun. 21, 2001

(65) Prior Publication Data
US 2003/0037684 A1 Feb. 27, 2003

(30) Foreign Application Priority Data
Dec. 17, 1999 (FR) .............................. 99 15955

(51) Int. Cl.[7] .............................................. B02C 9/04
(52) U.S. Cl. ............................. 241/12; 241/18; 241/21; 241/57; 241/62; 241/65
(58) Field of Search ................................ 426/335, 532; 241/65, 30, 21, 18, 12, 62, 57

(56) References Cited

U.S. PATENT DOCUMENTS 2,379,677 A    7/1945  Borsakovsky
5,403,602 A *  4/1995  Endico ........................ 426/231
5,703,009 A   12/1997  Yvin
5,816,498 A * 10/1998  Smith et al. ................. 239/172
6,013,297 A *  1/2000  Endico ........................ 426/335

FOREIGN PATENT DOCUMENTS

DE    44 26 648      1/1996
FR    2 710 812      4/1995
WO    WO 99/39723    8/1999

OTHER PUBLICATIONS

Derwent Publications Ltd. XP–002165161. "Disinfecting cereals" & HU 9 802 613. Aug. 28, 2000.

Derwent Publications Ltd. XP–002165162. "Improving wheat flour quality" & JP 59 048040. Mar. 19, 1984.

Naito et al. "Studies on utilization of ozone in food preservation". *Journal of Antibacterial and Antifungal Agents*, vol. 17, No. 11, pp. 517–526, 1989.

Derwent Publications Ltd. XP–002145926. "Grain processing–comprises using ozone solution in washing" * JP 9 275916. Oct. 18, 1997.

* cited by examiner

*Primary Examiner*—Mark Rosenbaum
(74) *Attorney, Agent, or Firm*—Merchant & Gould P.C.

(57) ABSTRACT

The present invention relates to a method for making flours having a high food safety level comprising the grinding of grains previously cleaned and moistened, characterized in that, prior to or simultaneously with said grinding, said grains are brought into contact with ozone produced from a carrier gas, preferably in a quantity of between 0.5 and 20 expressed in grams of ozone per kilo of grains.

16 Claims, 3 Drawing Sheets

METHOD AND INSTALLATION FOR MAKING FLOUR FROM OZONE-TREATED GRAINS

The subject of the present invention is a novel method for making flours intended for human consumption or as animal feed and having a high food safety level.

It also relates to a specific installation suitable for carrying out this method.

The invention finds in particular application in the field of industrial milling, specialized milling, in the production of specific flours as well as in the industrial making of bakery products and of animal feed.

It is known that grains obtained in particular from cereals and intended for the production of flours have, before milling, when they are used in the natural state, a number of contaminants of telluric origin, or resulting from contamination during storage.

These contaminants are generally situated at the periphery of the grains and exist in the form of microbes, bacteria, pesticide residues, mycotoxins and various spores.

During the milling phase, the contaminated peripheral tegument is brought into intimate contact with the flour obtained by grinding the inner part of the grain. During this operation, the peripheral contamination therefore contaminates the flours, which results in problems of food safety, preservation, and use, which, in some cases, can make the flours thus obtained unfit for consumption.

Milling industries, whether nonindustrial or industrial, are nowadays confronted with problems of contamination and various solutions have been recommended for remedying them.

Thus, it has been proposed to subject the grains before milling:

either to a physical treatment by ionization;

or to a chemical treatment, in particular with hydrogen peroxide.

However, these two techniques have various disadvantages which have prevented their generalized use.

Indeed, ionization involves the use of radioactive sources which are perfectly controlled, and geographically sited at appropriate sites which do not correspond to the sites of production of the flours. The resulting cost of transportation, which adds to the cost of treatment proper, makes ionization extremely expensive and constraining, such that its use remains limited to a few very specific uses involving very small quantities of grains.

Moreover, chemical treatment of the grains with hydrogen peroxide is not perfectly satisfactory since it is accompanied by bacterial reviviscence after treatment and requires, because of the nature of this reagent, special precautions during use and a control which is hardly compatible with the use envisaged.

Chemical agents other than hydrogen peroxide have also been envisaged for decontamination treatments of grains, among which there may be mentioned:

chlorine and chlorine-containing agents, whose recently demonstrated mutagenic and carcinogenic properties in fact limit the use thereof;

peracetic acid whose use causes a reduction in the organoleptic qualities of the grains and requires a controlled use which is hardly compatible with the use envisaged.

It is known, moreover, that the ozone produced from carrier gases, which can be either atmospheric oxygen, pure oxygen or a mixture of the two in variable proportions, has sterilizing properties which have been widely exploited in the treatment of water intended for human consumption, as well as in an industrial setting (fish farming, shellfish farming, pharmacy and fine chemistry).

The use of ozone was also recommended in particular in patent FR No. 93 11776 in the context of the treatment of seeds and of bulbs, but only with the aim of improving germination.

Under these conditions, the aim of the present invention is to solve the technical problem consisting in providing a novel method for making flours having a high food safety level which can be relatively easily used directly at the sites of manufacture and regardless of the quantities of grains to be treated, while preserving the technological qualities of the flours necessary in particular in breadmaking.

It has been discovered, and this constitutes the basis of the present invention, that it was possible to decontaminate grains before milling and even to very significantly improve the qualities of the flours obtained by grinding these grains, as well as the qualities of the by-products, by prior treatment of said grains with ozone produced from a carrier gas, without the use of additional treatment agents, and under conditions of implementation, in particular of duration, which are compatible with a continuous industrial use.

Thus, according to a first aspect, the subject of the present invention is a method for making flours having a high food safety level comprising the grinding of grains previously cleaned and moistened, characterized in that, prior to or simultaneously with said grinding, said grains are brought into contact with ozone produced from a carrier gas, preferably in a quantity of between 0.5 and 20 expressed in grams of ozone per kilo of grains.

This method makes it possible to solve, for the first time and in a completely satisfactory manner, the problem of the contamination of flours with which milling industries are confronted.

It is known in milling techniques, that to obtain good grinding, it is necessary to moisten the grains before carrying out the milling operation. This moistening is up until now carried out with untreated water and the moistening phase is generally followed by a rest phase during which the development of the strains present is further promoted because of the moisture provided.

According to a particular characteristic of the method in accordance with the invention, the water serving for moistening the grains is treated beforehand with ozone.

It has indeed been observed that this prior treatment with ozone of the water serving for moistening the grains made it possible to further improve the beneficial effects observed by the sole prior dry treatment of the grains and to surprisingly avoid the reviviscence of the strains present at the periphery of the tegument during the abovementioned rest phase.

It has also been observed, unexpectedly, by conventional breadmaking tests, that the doughs made from flour obtained from grains which have undergone this prior treatment had improved characteristics which are particularly suitable for making sweetened products of the English or Genoese fruitcake type, of the mixed type for coating (donuts, breadcrumb dressing, and the like) and of industrial breadmaking products.

A second subject of the invention therefore consists in the use of the flour thus treated for the making of these products.

This particular use of the method in accordance with the present invention, combining a dry treatment and a wet treatment of the grains before milling constitutes a currently preferred embodiment of the invention.

According to a particular characteristic of the method in accordance with the invention, the period for which the grains are brought into contact with the ozone is between 5 and 70 min, and preferably between 15 and 40 min.

According to another particular characteristic, the ozone used is produced from a dry carrier gas and in that the concentration of ozone in the carrier gas is between 80 and 160 g/m$^3$ STP, and preferably between 100 and 120 g/m$^3$ STP.

According to yet another particular characteristic, the pressure of the ozone-containing carrier gas during the bringing into contact with the grains is between 200 and 500 mbar.

According to a third aspect, the subject of the present invention is a specific installation intended for carrying out the method which has just been described.

This installation, of the type comprising means of storage and optionally of mixing the grains, first means of cleaning the grains thus stored and optionally mixed, means of moistening the grains, means of resting the grains thus moistened, second means of cleaning the grains after resting, means of grinding the grains, is essentially characterized in that it comprises, in addition, means of bringing the grains into contact with ozone produced from a carrier gas, arranged upstream or at the level of the grinding means.

The invention will be understood more clearly, and other aims, characteristics and advantages thereof will emerge more clearly on reading the explanatory description which follows, made with reference to the examples and to the accompanying schematic drawings given entirely without limitation and in which.

Figure 1:
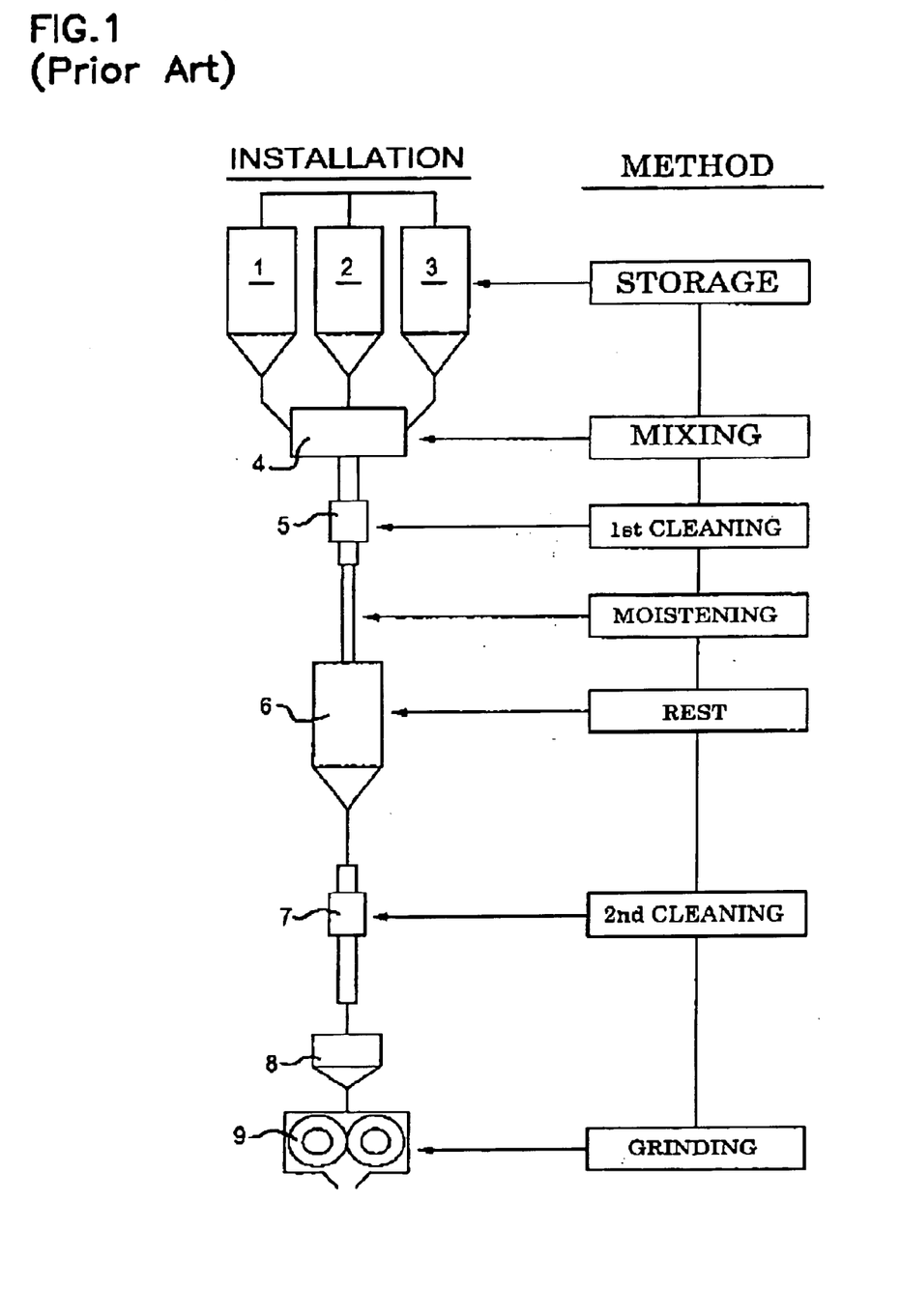
FIG. 1 schematically illustrates a traditional method and installation for making flours.

With reference to FIG. 1, a method and an installation for making flours in accordance with the known state of the art will therefore be first of all described.

Grains, for example wheat grains, obtained from an agricultural setting, are stored in storage silos respectively designated by the reference numbers 1, 2 and 3 in the example represented, and of which the number may be freely chosen to be perfectly adapted to the industrial structure of the site and to the required autonomy.

These grains have, in the natural state, a residual moisture which is generally of the order of 13% in the case of wheat.

When it is desired to make flours from various wheat varieties, the grains thus stored are mixed in a mixing device 4.

The grains are then subjected to a first cleaning phase intended in particular to separate the lightest particles, for example by blowing, using an appropriate device 5 well known to persons skilled in the art.

After this first cleaning phase, the grains are moistened by supplying water and are mixed.

The quantity of water supplied to the grains is adjusted such that the residual moisture of the grains, measured for example by hydrometry or by weighing, is optimum in order to carry out the milling operation, that is to say of the order of 18%, in the case of wheat.

The grains thus moistened are subjected to a so-called "rest" phase in a silo 6 for a period generally of between 8 and 36 h.

After this rest phase, the grains are subjected to a second cleaning phase, which may also be carried out by blowing with air, by means of an appropriate device 7.

This second cleaning phase makes it possible in particular to recover, as by-product, the envelopes of the grains (bran) used as animal feed.

The grains thus moistened and cleaned are subjected to a grinding phase in a grinder 9 which may be of a type well known to persons skilled in the art.

The grinder 9 may be continuously fed, in a manner known per se, using an intermediate buffer silo 8.

Figure 2:
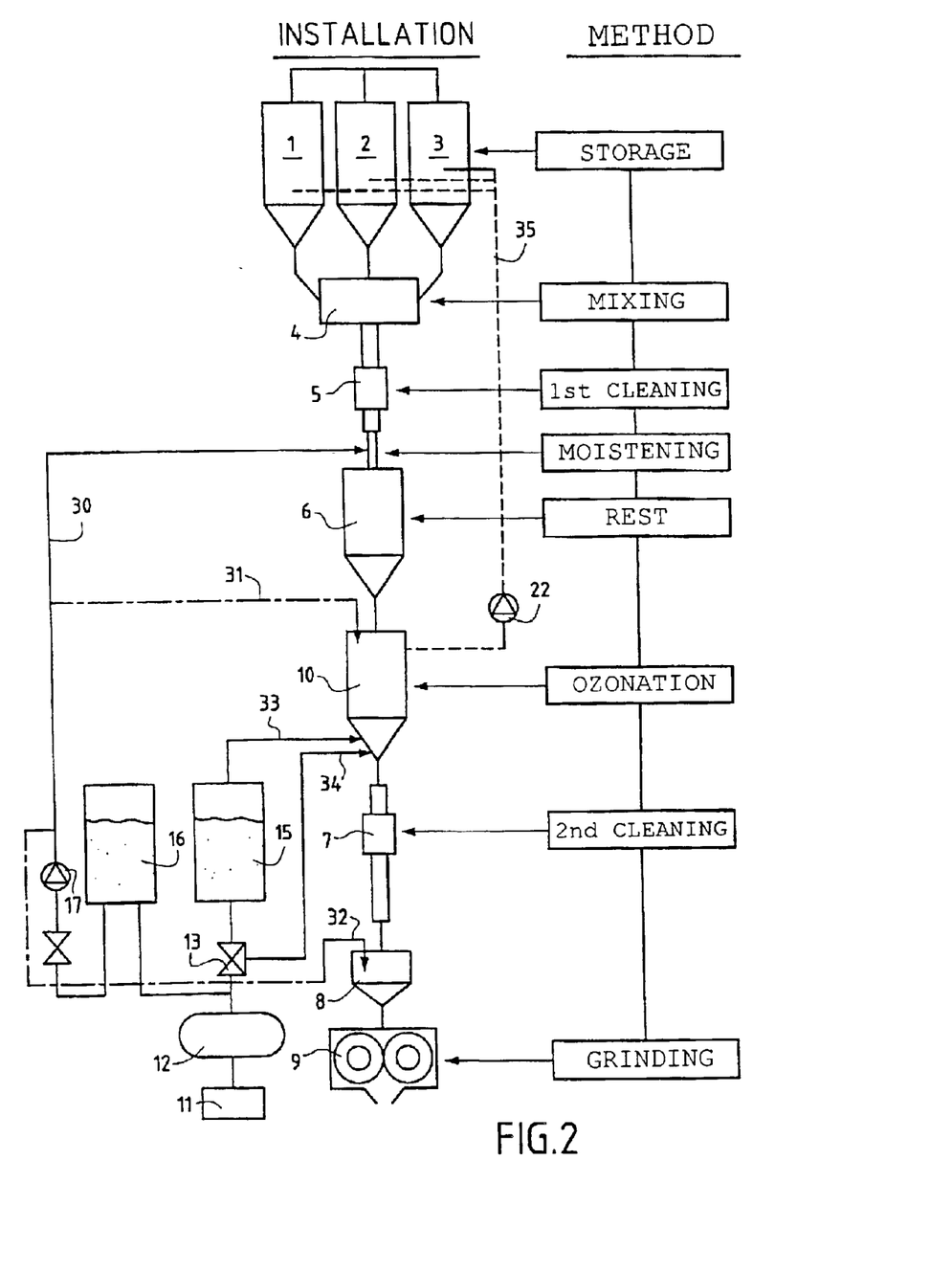
FIG. 2 is a view similar to FIG. 1 of a method and an installation for making flours in accordance with the present invention.

With reference to FIG. 2, a method and an installation for making flours in accordance with the present invention will now be described.

In this figure, the components identical to those described above with reference to FIG. 1 carry the same reference symbols.

The method in accordance with the present invention, which constitutes an improvement of the traditional method for making flours which has just been described with reference to FIG. 1, is essentially characterized in that prior to or simultaneously with the grinding, the grains are brought into contact with ozone produced from a carrier gas in a predetermined quantity and for a predetermined period.

Advantageously, the grains are brought into contact with the ozone between the rest phase and the second cleaning phase, as indicated above.

In the embodiment represented in FIG. 2, the grains, after resting, are introduced into a reactor 10 for treating with ozone (or contact reactor) of which a currently preferred embodiment will be described in greater detail later.

In accordance with the present invention, the contact reactor 10 may be independently supplied with dry ozone, moist ozone or ozonated water.

The ozone is produced from a carrier gas advantageously consisting of pure oxygen stored in a container 11.

Alternatively, the carrier gas may be produced from ambient air, filtered, compressed and dried at the dew point of between −50 and −70° C.

Alternatively still, the carrier gas may consist of a mixture, in any proportion, of pure oxygen and air which has been filtered, compressed and dried.

The ozonizer 12 thus makes it possible to produce a stream of dry ozone-containing carrier gas having a dew point of between −50 and −70° C.

This dry gas stream may be used:

on the one hand, to directly supply the contact reactor 10 in a controlled manner by a regulating valve 13; said gaseous stream being conveyed to the contact reactor by the conduit 34;

on the other hand, for preparing a moistened ozone-containing gas stream, also intended to supply the contact reactor 10; and finally, for preparing ozonated water advantageously intended to moisten the grains after the first cleaning phase, and optionally for also supplying the contact reactor 10.

The dry ozone-containing carrier gas produced by the ozonizer 12 is moistened at room temperature conditions by passing through a liquid bed contained in a moistening column represented by the reference number 15.

The dimensions of this column should be calculated to allow sufficient evaporation of water to ensure saturation at the pressure and temperature conditions of the method.

In general, the ratio between the liquid height and the column diameter may be between 1.7 and 2.5, preferably equal to 2.

The column 15 comprises, at its top part, an outlet for the ozone-containing carrier gas thus moistened, which may be conveyed by a conduit 33 to the contact reactor 10.

The ozonated water may be produced from the dry ozone-containing carrier gas coming from the ozonizer 12 by means of a dissolving reactor represented by the reference number 16.

In this reactor, the dry ozone is brought into contact with an aqueous phase in the form of bubbles whose diameter may be between 2 and 4 mm.

These bubbles are created with the aid of porous disk-containing devices, "herring-bone" devices comprising calibrated holes, or any other device known to a person skilled in the art, such as a dissolving turbine, a shearing turbine or a hydroejector with an intense recirculation device.

In general, the higher the concentration of dissolved ozone in the water, the shorter the residence time of the water in the dissolving reactor 16.

Thus, the residence time of the ozonated water in the dissolving reactor 16 will usually be between 2 and 12 min, preferably between 3 and 6 min.

The conditions for dissolving the ozone in the water essentially depend on the concentration of ozone in the carrier gas, the pressure for applying the ozone, the residual pressure in the gaseous ceiling, as well as the size of the bubbles and the hydrodynamic regime at the interface of the bubbles.

Persons skilled in the art will have no difficulty, during the calculation of the dissolving reactor 16, in maximizing the parameters promoting gaseous transfer toward the liquid phase, by preferably adjusting the concentration of ozone in the gaseous phase, by increasing the height of static water in the dissolving reactor, by increasing the residual pressure in the gaseous ceiling, by increasing the overall interfacial surface area for exchange, or by increasing the hydrodynamic regime at the gas-liquid interface (speed of the fluid, turbulence).

The ozonated water is extracted from the dissolving reactor 16 by a pump 17 and may be conveyed:

to the zone for moistening the grains, by a conduit 30;

to the reactor for bringing into contact 10 by a conduit 31; and optionally, to the buffer silo 8 prior to the stage for grinding the grains, by a conduit 32.

All these devices for supplying with moistened, dry ozone and with ozonated water make it possible to ensure optimum treatment of the grains, by combining a dry treatment with a wet treatment.

Such a combination is, for example, recommended in the context of the treatment of grains for the preparation of flours intended for breadmaking.

In other cases, such as for example the preparation of animal meals, or the preparation of flours for dairy products, a treatment by only the dry route generally proves satisfactory.

The moistening necessary for the superficial impregnation of the grains is preferably provided by the ozonated water serving during the moistening stage and additionally, optionally, by the adjustable continuous spraying into the reactor for bringing into contact 10 as well as by the moisture provided by the moistened ozone-containing gas.

The ozonated water extracted from the dissolving reactor 16 may optionally also be conveyed to the storage silos 1, 2 and 3 for premoistening of the grains.

It is also possible to effectively use the residual ozone present in the carrier gas after reaction in the reactor for bringing into contact 10, by extracting it with a compressor 22 and by conveying it by a conduit 35 to the storage silos 1, 2 and 3.

The residual ozone thus recovered allows a pretreatment of the grains which may be advantageously combined with the abovementioned premoistening.

In general, the reactor for bringing into contact 10 may be vertical and consist of a cylindrical or cylindroconical body with a conical base comprising an internal device providing a circulation and a residence time of the grains in the reactor for bringing into contact which are sufficient to ensure optimum treatment with the ozone. The bringing of the grains into contact with the ozone may be carried out continuously or batchwise in the reactor.

In general:

the overall residence time of the grains in the reactor for bringing into contact is usually between 5 and 70 min, and preferably between 15 and 40 min;

the degree of internal recirculation of the grains (that is to say of the number of passes of the grains in the zone for bringing into contact with the ozone) is usually of the order of 10 to 40, and preferably of 20 to 30.

The internal recirculation may be provided by a jacketed Archimedean screw type device driven by an electromechanical device allowing the speed of rotation of the screw to be adjusted so as to precisely provide the recirculation rate, which also depends on the thread and the diameter of the screw.

The contact reactor 10 is usually provided with a device for discharging the reactive gas after reaction, with a system for spraying ozonated water supplied by the conduit 31, a safety device supplied with water under pressure, a safety valve and a breaking disk.

At the bottom part, the contact reactor 10 comprises a device for introducing and distributing the ozone-containing gas designed so as to ensure distribution of the gas in the mass of grains with a sufficient speed of injection to ensure good penetration of said gas into the mass to be treated.

In general:

the speed of injection will be between 10 et 80 m.s$^{-1}$, preferably between 30 and 50 m.s$^{-1}$;

the concentration of ozone in the carrier gas will be between 80 and 160 g/m$^3$ STP (Standard Temperature and Pressure), preferably between 100 and 120 g/m$^3$ STP.

Moreover, the ozonation reaction being of the exothermic type, the body of the reactor for bringing into contact is usually provided with a cooling device which makes it possible to maintain a constant temperature inside said reactor for bringing into contact and in the reaction medium without a vertical or radial temperature gradient, during the time necessary for the reaction.

This effective cooling of the reactor for bringing into contact promotes a safe use thereof, and allows precise control of the ozonation reaction.

The cooling device may, for example, be supplied with cold water under pressure or via a circuit of ice-cold water produced by a refrigerating set.

Figure 3:
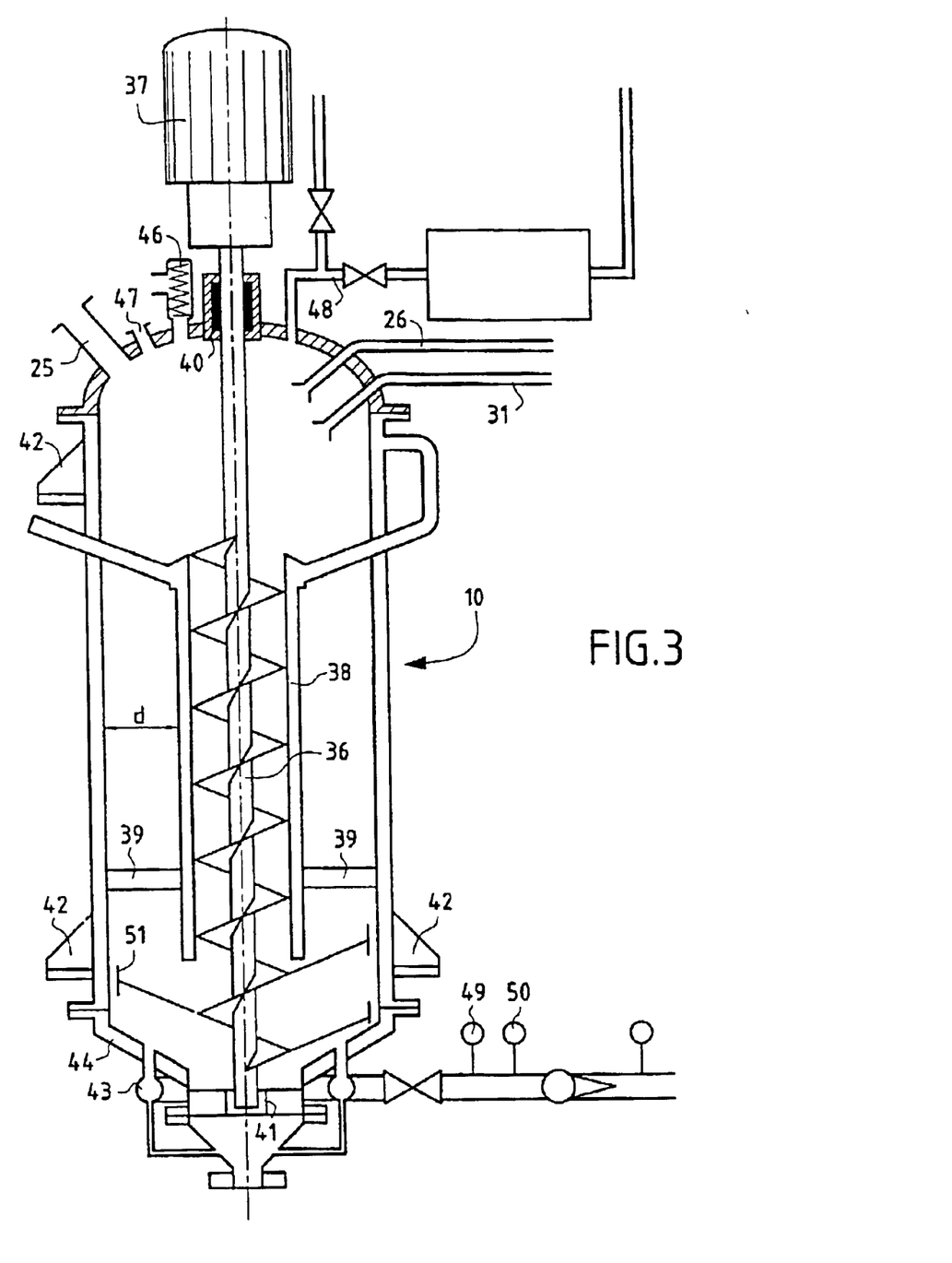
FIG. 3 is a longitudinal sectional view of a contact reactor, specifically adapted for bringing the grains into contact with ozone in the context of the present invention.

A currently preferred embodiment of the contact reactor 10 specifically adapted for optimum use of the method in accordance with the invention has been represented in FIG. 3.

This reactor for bringing into contact essentially comprises a central endless screw 36 driven by a variable speed geared motor 37 and surrounded by a central jacket 38 delimiting the preferred zone for bringing the grains into contact with the ozone.

The central jacket 38 is positioned relative to the walls of the contact reactor by means of a centering device 39 well known to a person skilled in the art, and comprises cooling means which make it possible to cool the reacting mass and to avoid radial temperature gradients.

The central screw 36 is positioned and centered inside the contact reactor 10 by components 40 and 41 known to a person skilled in the art, positioned at the top part and at the bottom part, respectively, of the contact reactor and ensuring imperviousness of the reactor.

Moreover, the contact reactor 10 comprises a supporting component 42 designed to support and block the contact reactor canceling the rotating torque generated by the movement of the screw.

At the bottom part of the contact reactor 10, at the level of the base cone, there are inserted devices for injection of the ozone-containing gas such as nozzles represented by the reference number 43, which are advantageously radially arranged externally to the jacket 38 to allow optimum penetration and distribution of the gas into the bulk of the grains to be treated.

In general, these injection devices are arranged, radially and external to the jacket 38, at a distance of between 0.17 d and 0.8 d and preferably between 0.3 d and 0.67 d, where d represents the distance separating the external wall of the jacket 38 from the internal wall of the contact reactor 10.

The number of injection nozzles 43 will be chosen such that the speed of ejection of the ozone is between 10 and 80 m/s, preferably between 30 and 50 m/s, and this number of nozzles will be generally between 15 and 85, preferably between 20 and 40.

The body of the contact reactor 10 as well as the base cone 44 are advantageously cooled by means of an external cooling device which may, for example, consist of a conventional "water jacket" type device or of a circuit consisting of female molds ensuring capturing of the heat flow from the reaction mass and discharging it outside.

This cooling device will be advantageously provided with control means such as a flowmeter, a counter, and the like, which are well known to a person skilled in the art.

At the top part, the reactor for bringing into contact comprises:
- a device 25 for introducing the grains to be treated;
- a safety valve 46;
- a disrupting disk 47;
- a disk for extraction of the residual gas 48;
- a disk for supplying with water (fire safety) designated by the reference number 26;
- a device for supplying with ozonated water allowing possible adjustment of the moisture of the grains during treatment.

The contact reactor 10 may be equipped, in a manner known per se, with means for controlling the temperature and the pressure, designated by the reference numbers 49 and 50, respectively.

The endless screw 36 is advantageously equipped, in its bottom part, with scraping arms 51, preferably 4 in number, designed and distributed to ensure a constant and homogeneous torque, to promote mixing of the grains, to ensure their migration to the center of the contact reactor and their distribution by the endless screw.

The materials constituting the body of the contact reactor 10 will be chosen so as to ensure resistance to abrasion and to oxidation generated by the presence of ozone at high concentration. Such a material may be, for example, stainless steel, known to a person skilled in the art.

In general, it has been observed that decontamination of the grains is all the more effective if the renewal of the interfacial surface area for exchange (grains-reactive ozone) was intense, and if the overall accessibility was maximized.

The contact reactor 10 should therefore be advantageously designed to perfectly correspond to these parameters, ensuring effective mixing of the grains and an optimized degree of recirculation of the latter in the zone for treating with ozone.

The degree of recirculation essentially depends on the endless screw thread, its filling rate which depends itself on the size of the grains and the speed of rotation of the endless screw.

In general, it has been observed that the following parameters lead to the best results:
- "screw diameter/reactor diameter" ratio: between 0.1 and 0.5, preferably between 0.25 and 0.35;
- "screw thread/screw diameter" ratio: between 0.4 and 1.1, preferably between 0.6 and 0.8;
- screw filling rate: between 15% and 95%, preferably between 55% and 82%;
- speed of rotation of the screw: between 50 and 200 rpm, preferably between 80 and 120 rpm with the possibility of variation in this range so as to correspond to the geometry and to the variable diameter of the grains to be treated;
- "useful reactor height/reactor diameter" ratio: between 1.1 and 2, and preferably between 1.3 and 1.6;
- "jacket height/diameter" ratio: between 1.4 and 2.2, preferably 1.5 and 1.8;
- "internal diameter of the jacket/reactor diameter" ratio: between 0.1 and 0.5, preferably between 0.25 and 0.35;
- angle of the base cone between 60° and 120°;
- "total reactor height/reactor diameter" ratio: between 1.5 and 5, preferably 2.2 and 3.2.

The first trials for carrying out the method in accordance with the present invention made it possible to demonstrate a considerable improvement from the microbiological point of view in the quality of the flours obtained, compared with the use of a traditional method.

Thus, it was observed that the method in accordance with the present invention makes it possible to practically eliminate any microbiological contamination, in particular as regards mesophilic aerobic flora (M.A.F), the total coliforms, molds and yeasts.

The results obtained by the conventional methods for evaluating the abovementioned microbiological criteria on control samples (traditional method) and samples treated by the method in accordance with the invention have been summarized in table A.

These results demonstrate the very high food safety level which the method in accordance with the present invention makes it possible to obtain.

TABLE A

| | | | |
|---|---|---|---|
| MAF | Control | 22 000 000 | Reduction: 99.90% |
| | Treated | 13 000 | |
| Total coliforms | Control | 2 800 000 | Reduction: 99.90% |
| | Treated | 900 | |
| Molds | Control | 80 000 | Reduction: 99.85% |
| | Treated | 120 | |
| Yeasts | Control | 200 000 | Reduction: 99.80% |
| | Treated | 310 | |

Other trials were also carried out to evaluate the influence of the method in accordance with the present invention on the destruction of mycotoxins and in particular of ochratoxine A in wheat.

The results obtained by HPLC equipped with fluorimetric detection between a control batch and a batch treated by the method in accordance with the invention are the following:
Control batch: 39.80 µg/kg
Treated batch: 2.5 µg/kg which corresponds to a reduction of the order of 94%, making it possible to obtain a perfectly satisfactory product from the point of view of the required food quality standards (standard: 5 µg/kg).

Other trials also demonstrated the value of the method in accordance with the present invention on the reduction of contaminants resulting from the use of pesticides.

A reduction of about 80% in the content of Chlorpyriphosmethyl (a pesticide generally used in the case of wheat) was thus observed, thus leading certainly to a product which is perfectly acceptable from the point of view of the current food standards.

To demonstrate the technological qualities of the flours obtained by the method of the invention, conventional breadmaking tests were used, such as the determination of volume, smoothing, elasticity, porosity, firmness, stickiness, of the color and absorption of water.

The characteristics of the following 5 breadmaking batches were thus evaluated:

2 control batches for which the grains were not treated with ozone (batches Nos. 1 and 2);

1 batch ozonated at a rate of 5 g/kg of grains immediately after moistening, and then allowed to rest for 24 hours before milling (batch No. 3);

2 batches moistened beforehand, allowed to rest for 24 hours, and then ozonated, one at a rate of 5 g/kg of grains and the other at a rate of 4 g/kg of grains (batches Nos. 4 and 5 respectively).

For this evaluation, the following thirty criteria, grouped into 3 classes, were first of all taken into account:

1) Dough kneading: consistency, stability, smoothing at 10°, smoothing, stickiness molding: extensibility, elasticity, firmness, tearing, stickiness proofing: activity, stickiness, stability in the oven (mini-maxi)

2) Bread crust: color, thickness, crispness blade cut: slash in loaf (mini-maxi), evenness (mini-maxi), tearing (mini-maxi);

development: transverse section (mini-maxi), volume

3) Crumb color cell formation elasticity odor/taste

A score of 0 to 5 was used for each criterion. It was found that the criteria for the batches according to the invention (3 to 5) were comparable for all the criteria for the control batches.

Another evaluation criterion was then used which is the P/L ratio obtained from the conventional Chopin alveogram.

The applicant observed that by treating the grains with ozone before milling, the doughs made from the flours obtained by the method of the invention had a completely modified alveogram.

The results obtained showed that the increase in the ozone zone applied during the treatment of the grains is perfectly correlated with an increase in strength and a decrease in extensibility.

Thus, by virtue of the method of the invention, it is possible to choose and to control the increase in the P/L ratio for a given flour by the choice of the level of treatment of the grains with ozone and by the preliminary moistening of the grains with water, ozonated water or a mixture of the two.

Most particularly, depending on the variety or the climatic conditions, it is thus possible to improve the quality of the flour (as in the case of an excessively extensible flour).

The results have also demonstrated the fact that by using a flour obtained from grains previously treated with ozonated water:

the dough used for making products which do not rise excessively during baking, such as sweetened products of the English or Genoese fruitcake type, does not decrease again after baking, and does not exhibit the characteristic phenomenon of collapse often observed. The quantity of ozone used is preferably at least 8 to 20 g of ozone/kg of grains, a quantity of 10 g of ozone/kg of grains being advantageously preferred;

the mixes for coatings (such as donuts, breadcrumb dressing, and the like) do not exhibit the disadvantages observed during the use of conventional flours which are the formation of vesicles or cracks at the surface of the products. By contrast, the surface of the mixes obtained according to the present invention have a homogeneous monolithic appearance, without the formation of vesicles, because of the possibility of allowing the trapped baking gases to gush to the surface, such that the visual appearance is considerably improved;

the doughs used for the industrial manufacture of doughs and of breadmaking products, which are naturally too extensible, are capable of absorbing a volume of water which is higher than the usual conditions. The quantity of ozone used is preferably 3 g of ozone/kg of grains.

Finally, it was observed that it was possible to improve the alveometry without substantially modifying the W value (P/L ratio) of the doughs made from the flours obtained from grains previously treated with an ozone-containing gas by the dry or wet route, or after prior moistening with water or with ozonated water, and for a treatment rate of between 2 and 8 g of ozone/kg of grains, preferably between 3 and 5 g/kg of grains.

The method which has just been described has very many advantages among which there may be mentioned in particular:

the simplicity of implementation, since this method perfectly fits into the methods and installations for making flours which are commonly used;

the food safety of the flours obtained; the combination of a dry and wet treatment making it possible to avoid the reviviscence of the strains present at the periphery of the tegument during the rest phase, while preserving, or even improving, the technological qualities of the flours obtained.

This method makes it possible, in addition, to obtain by-products of milling (bran) free of contamination, and the digestibility of which was found to be thereby improved.

What is claimed is:

1. In a method for making flours having a high food safety level comprising bringing grains previously cleaned and moistened into contact with ozone produced from a carrier gas, and grinding said grains simultaneously or alter the said step of bringing the grains into contact with ozone, wherein the improvement consists in that the water used for moistening the grains is treated beforehand with ozone.

2. The method as claimed in claim 1, wherein the period during which the grains are brought into contact with the ozone is between 5 and 70 win.

3. The method as claimed in claim 1, wherein the ozone used is produced from a dry carrier gas and the concentration of ozone in the carrier gas is between 80 and 160 g/m$^3$ STP.

4. The method as claimed in claim 1, wherein the pressure of the ozone-containing carrier gas during the bringing into contact with the grains is between 200 and 500 mbar.

5. The method as claimed in claim 1, wherein the ozone used is produced from a dry carrier gas and from a moistened carrier gas.

6. The method as claimed in claim 1, wherein the bringing of the grams into contact with the ozone is carried out continuously.

7. The method as claimed in claim 1, wherein the period during which the grains are brought into contact with the ozone is between 15 and 40 mm.

8. The method as claimed in claim 1, wherein the ozone used is produced from a dry carrier gas and the concentration of ozone in the carrier gas is between 100 and 120 g/m$^3$ STP.

9. The method as claimed in claim 1, wherein the bringing of the grains into contact with the ozone is carried out batchwise in a vertical contact reactor comprising a device for internal recirculation of the grains.

10. A method as claimed in claim 1, wherein the quantity of ozone brought into contact with said grains is of between 0.5 and 20 expressed in grams of ozone per kilo of grains.

11. A method as claimed in claims 1, wherein the quantity of ozone brought into contact with said grains is of between 8 and 20 expressed in grams of ozone per kilo of grains.

12. A method as claimed in claim 1, wherein the quantity of ozone brought into contact with said grains is of 3 expressed in grams of ozone per kilo of grains.

13. An installation for carrying out the method for making flours comprising:

means of storage (1, 2, 3) and optionally for mixing (4) the grains;

first means (5) for cleaning the grains thus stored and optionally mixed;

means for moistening the grains by water treated beforehand with ozone;

means for resting (6) the grains thus moistened;

second means (7) for cleaning the grains after resting;

means for grinding (9) the grains, means (10) for bringing the grains into contact with ozone produced from a carrier gas, arranged upstream or at the level of the grinding means.

14. The installation as claimed in claim 13, which further comprises dissolving means (16) for the production of ozonated said water used for moistering grains starting from a dry ozone-containing carrier gas produced by an ozonizer (12).

15. The installation as claimed in claim 14, wherein the means for bringing the grains into contact with the ozone mentioned above are arranged upstream of the grinding means and comprise a vertical contact reactor (10) comprising a device for internal recirculation of the grains.

16. The installation as claimed in claim 15, wherein the device for internal recirculation of the grains comprising an endless screw (36) surrounded by a jacket (38).

\* \* \* \* \*

UNITED STATES PATENT AND TRADEMARK OFFICE
CERTIFICATE OF CORRECTION

PATENT NO. : 6,915,969 B2
DATED : July 12, 2005
INVENTOR(S) : Yvin et al.

It is certified that error appears in the above-identified patent and that said Letters Patent is hereby corrected as shown below:

Column 10,
Line 46, "grains simultaneously or alter the said" should read -- grains simultaneously or after the said --.

Column 12,
Line 11, "water used for moistering grains" should read -- water used for moistening grains --.

Signed and Sealed this

Twentieth Day of December, 2005

JON W. DUDAS
*Director of the United States Patent and Trademark Office*